United States Patent
Zhao et al.

(10) Patent No.: US 11,459,026 B2
(45) Date of Patent: Oct. 4, 2022

(54) BACKUP CONTROL OF ELECTRIC POWER STEERING SYSTEM WHEN SENSOR FAILURE OCCURS

(71) Applicant: Robert Bosch GmbH, Stuttgart (DE)

(72) Inventors: Zheng Zhao, Novi, MI (US);
Duanxiang Zhang, Novi, MI (US);
Arnulf Heilig, Schwaebisch Gmuend (DE)

(73) Assignee: ROBERT BOSCH GMBH, Stuttgart (DE)

( * ) Notice: Subject to any disclaimer, the term of this patent is extended or adjusted under 35 U.S.C. 154(b) by 181 days.

(21) Appl. No.: 16/880,549

(22) Filed: May 21, 2020

(65) Prior Publication Data

US 2021/0362777 A1    Nov. 25, 2021

(51) Int. Cl.
*B62D 5/04* (2006.01)
*B62D 6/00* (2006.01)
*G07C 5/08* (2006.01)

(52) U.S. Cl.
CPC .......... *B62D 5/0484* (2013.01); *B62D 5/049* (2013.01); *B62D 5/0463* (2013.01); *B62D 6/00* (2013.01); *G07C 5/0808* (2013.01)

(58) Field of Classification Search
CPC ......... B62D 15/02; B62D 1/20; G07C 5/0808
See application file for complete search history.

(56) References Cited

U.S. PATENT DOCUMENTS

| | | | |
|---|---|---|---|
| 6,328,128 B1 * | 12/2001 | Chikaraishi | B62D 5/049 180/443 |
| 7,530,422 B2 | 5/2009 | Bolourchi et al. | |
| 9,296,415 B2 | 3/2016 | Itamoto et al. | |
| 9,434,408 B2 | 9/2016 | Kojo et al. | |
| 9,540,040 B2 | 1/2017 | Varunjikar et al. | |
| 2005/0182575 A1 | 8/2005 | Kwasny et al. | |
| 2012/0271513 A1 | 10/2012 | Yoneda et al. | |
| 2014/0371992 A1 * | 12/2014 | Di Cairano | B62D 5/0463 701/42 |
| 2016/0101809 A1 * | 4/2016 | Hong | B62D 5/0463 701/43 |

(Continued)

FOREIGN PATENT DOCUMENTS

EP    2208659 B1    4/2011

*Primary Examiner* — Jeff A Burke
*Assistant Examiner* — Jerrod Irvin Davis
(74) *Attorney, Agent, or Firm* — Michael Best & Friedrich LLP (57) ABSTRACT

Systems and methods for controlling an electric power steering system. The system includes an electric motor configured to provide a torque to a steering mechanism of a vehicle, a torsion bar torque sensor, a vehicle speed sensor, and a steering angle sensor. The system also includes an electronic controller configured to determine a failure of the torsion bar torque sensor, receive a vehicle speed from the vehicle speed sensor and a steering angle from the steering angle sensor, calculate a steering assistance torque based on the vehicle speed and the steering angle, calculate a hysteresis torque based on the steering angle, sum the steering assistance torque and the hysteresis torque to determine a turning torque, calculate a return torque and sum the turning torque and return torque to obtain an output torque, and generate a command for the electric motor to provide the output torque to the steering mechanism.

16 Claims, 4 Drawing Sheets

(56) References Cited

U.S. PATENT DOCUMENTS

| | | |
|---|---|---|
| 2017/0166245 A1 | 6/2017 | Kim et al. |
| 2018/0099691 A1 | 4/2018 | Kim et al. |
| 2018/0346021 A1 | 12/2018 | Wang et al. |
| 2019/0039644 A1 | 2/2019 | Bernon-Enjalbert |
| 2019/0061809 A1* | 2/2019 | Weiefors ............... B62D 15/025 |
| 2019/0100234 A1* | 4/2019 | Kezobo ................. B62D 6/008 |
| 2020/0023885 A1* | 1/2020 | Choi ..................... B62D 5/003 |

* cited by examiner

BACKUP CONTROL OF ELECTRIC POWER STEERING SYSTEM WHEN SENSOR FAILURE OCCURS

FIELD OF THE INVENTION

Embodiments relate to controlling electric power steering systems.

BACKGROUND

Traditionally, power steering systems assist a driver in turning a steering wheel (or similar steering device manipulated by a driver) of a vehicle and, ultimately, one or more wheels of the vehicle. In an electric power steering system, driver inputs made to the steering wheel are sensed and an electric motor applies an additional torque to a steering rack, steering gear, or steering column in addition to a driver-provided torque. Electric power steering systems also includes rotational sensors that determine a position of a motor, a steering wheel position angle, a steering angle, and a rate of rotation of a steering column, as well as a torsion bar torque sensor. The torsion bar torque sensor determines an input torque from the driver by detecting a torque on a torsion bar connected to the steering column. Based upon the detected torque and one or more other data points, a steering assist motor torque is determined, and then applied by the motor to the steering rack, steering gear, or steering column in order to steer the vehicle.

SUMMARY

If the torsion bar torque sensor fails, the driver experiences sudden loss of power steering assistance, which makes steering the vehicle difficult. Therefore, a system is needed to provide electric power steering assistance in the event of the torsion bar torque sensor failing.

Embodiments provide, among other things, systems and methods for controlling an electric power steering system in the event that the torsion bar torque sensor fails.

One embodiment provides an electric power steering system. The system includes an electric motor configured to provide a torque to a steering mechanism of a vehicle, a torsion bar torque sensor, a vehicle speed sensor, and a steering angle sensor. The system also includes an electronic controller configured to determine a failure of the torsion bar torque sensor, receive a vehicle speed from the vehicle speed sensor and a steering angle from the steering angle sensor, calculate a steering assistance torque based on the vehicle speed and the steering angle, calculate a hysteresis torque based on the steering angle, sum the steering assistance torque and the hysteresis torque to determine a turning torque, calculate a return torque and sum the turning torque and return torque to obtain an output torque, and generate a command for the electric motor to provide the output torque to the steering mechanism.

Another embodiment provides a method for controlling an electric power steering system. The method includes determining, with an electronic controller, a failure in a torsion bar torque sensor and receiving, with the electronic controller, a vehicle speed from a vehicle speed sensor and a steering angle from a steering angle sensor. The method also includes calculating, with the electronic controller, a steering assistance torque based on the vehicle speed and the steering angle, calculating, with the electronic controller, a hysteresis torque based on the steering angle, and summing, with the electronic controller, the steering assistance torque and the hysteresis torque to determine a turning torque. The method also includes calculating, with the electronic controller, a return torque, summing, with the electronic controller, the turning torque and return torque to obtain an output torque, and generating, with the electronic controller, a command for an electric motor to provide the output torque to the steering mechanism.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "control units" and "controllers" described in the specification can include one or more electronic controllers, electronic processors, or similar devices, one or more memories including non-transitory computer-readable media, one or more input/output interfaces, one or more application specific integrated circuits (ASICs) and other circuits, and various connections (for example, wires, printed traces, and busses) connecting the various components.

Figure 1:
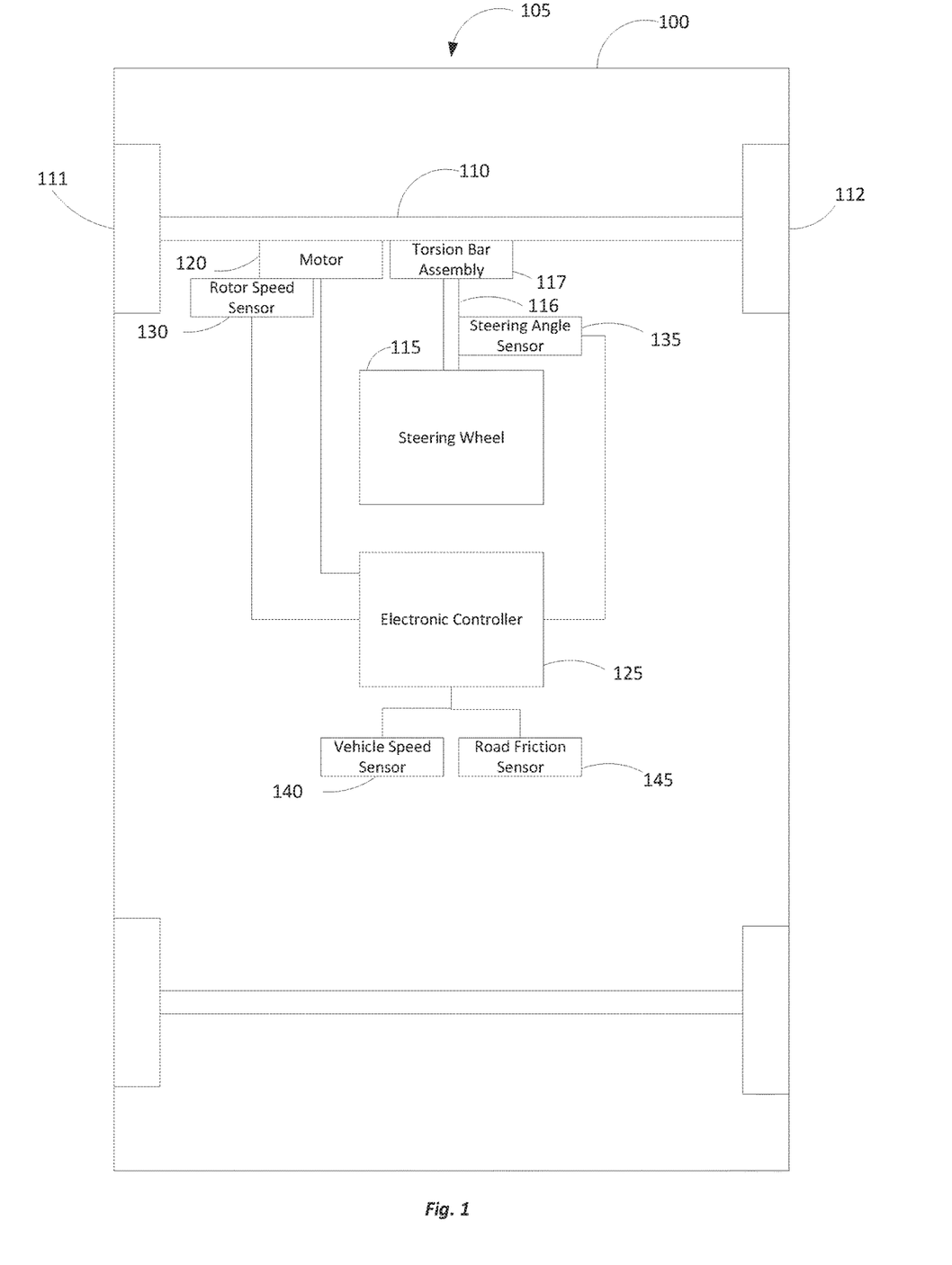
FIG. 1 illustrates a vehicle including an electric power steering system according to one embodiment.

FIG. 1 illustrates a vehicle 100 including an electric power steering ("EPS") system 105 according to one embodiment.

The EPS system 105 includes a steering rack 110 that steers wheels 111 and 112 via an input from a steering wheel 115, which is connected to the steering rack 110 via a steering column 116 and a torsion bar assembly 117. The torsion bar assembly 117 includes, in one embodiment, a torsion bar and a torsion bar torque sensor. The torsion bar torque sensor detects a torque applied to the torsion bar from the steering column 116. Based upon the detected torque and a command signal from an electronic controller (an example of which is described below), an electric motor 120 is configured to apply a torque to the steering rack 110 to steer the wheels 111 and 112.

Figure 2:
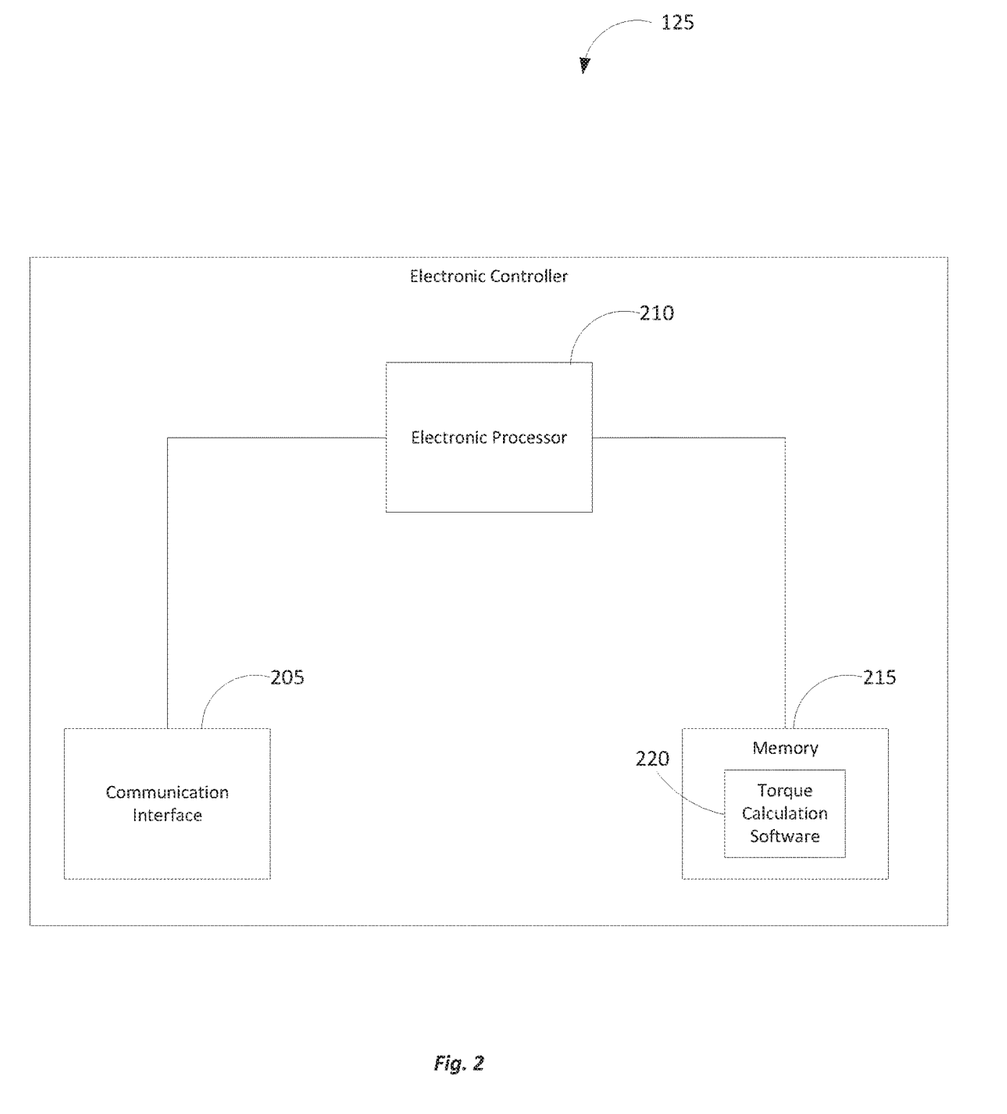
FIG. 2 illustrates an electronic controller according to one embodiment.

The EPS system 105 also includes an electronic controller 125. An example of the electronic controller 125 is illustrated in FIG. 2. The electronic controller 125 includes a communication interface 205, an electronic processor 210, and a memory 215. The communication interface 205 allows the electronic processor 210 to communicate with external hardware, such as the electric motor 120 and one or more sensors as described below. The electronic processor 210 is communicatively coupled to the communication interface 205 and the memory 215. The electronic processor 210 is configured to access the memory 215 and, among other things, execute instructions for the EPS system 105. The electronic processor 210 may be a microprocessor, an application-specific integrated circuit, or a similar processing circuit. The memory 215 is a non-transitory, computer-readable medium and contains instructions that, among other things, perform the methods and functions described herein when executed by the electronic processor 210.

In one embodiment, the memory 215 includes torque calculation software 220. The torque calculation software 220 determines the torque to be applied by the electric motor 120 and, among other things, performs the methods and functions described in this application.

Returning to FIG. 1, the EPS system 105 also includes a rotor speed sensor 130, a steering angle sensor 135, a vehicle speed sensor 140, and a road friction sensor 145. The rotor speed sensor 130 is electronically coupled to the electric motor 120 and is configured to detect a speed of a rotor of the electric motor 120. The steering angle sensor 135 is electronically coupled to the steering column 116 or the steering wheel 115 and is configured to detect a steering angle and a steering angle speed (rate of change) input by a driver of the vehicle 100. The vehicle spend sensor 140 is configured to detect how fast the vehicle 100 is traveling. The road friction sensor 145 is configured to determine a friction of the surface the vehicle 100 is traveling on.

The electronic controller 125 is communicatively connected to the torsion bar assembly 117, the electric motor 120, the rotor speed sensor 130, the steering angle sensor 135, the vehicle speed sensor 140, and the road friction sensor 145. Each of the sensors is configured to provide data to the electronic controller 125.

Figure 3:
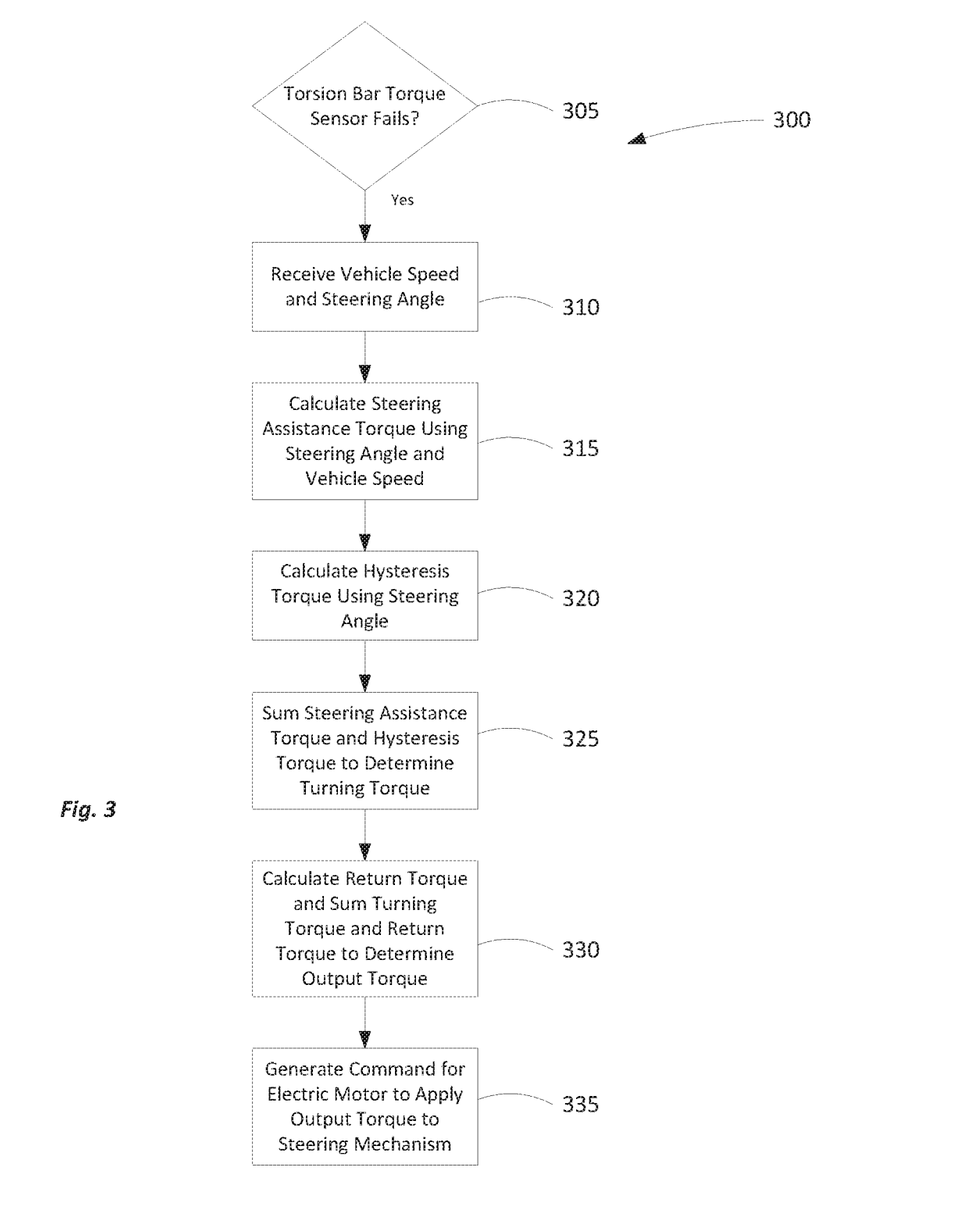
FIG. 3 illustrates a method for controlling an electric power steering system according to one embodiment.

FIG. 3 illustrates a method 300 for controlling the EPS system 105 according to one embodiment. The method 300 includes determining, with the electronic controller 125, if the torsion bar torque sensor of the torsion bar assembly 117 fails (step 305). In one embodiment, the electronic controller 125 normally receives a signal from the torsion bar torque sensor indicating a torque being applied to the torsion bar. If the electronic controller 125 stops receiving a signal from the torsion bar torque sensor, the electronic controller 125 determines that the torsion bar torque sensor has failed. In other embodiments, a separate sensor or circuit monitors the torsion bar torque sensor, detects when the torsion bar torque sensor fails, and sends an indication to the electronic controller 125 of the failure.

If the electronic controller 125 determines that the torsion bar torque sensor has failed, the electronic controller 125 receives a vehicle speed from the vehicle speed sensor 140 and a steering angle from the steering angle sensor 135 (step 310). In one embodiment, the steering angle sensor 135 provides both an absolute steering angle and a relative steering angle to the electronic controller 125. The absolute steering angle uses a center position ("0") and determines the difference in degrees between a current position of the steering wheel 115 and the center position. The relative steering wheel is the difference between two absolute steering angles. In one embodiment, the relative steering angle is determined based on the last absolute steering angle where a steering angle velocity (for example, a change in absolute steering angle of 0) and the current absolute steering angle.

The vehicle speed and the steering angle are then used by the electronic controller 125 to calculate a steering assistance torque (step 315). The steering assistance torque uses a three-dimension look-up table to determine the steering assistance torque based on the vehicle speed and the steering angle. In some embodiments, the look-up table is populated with one or more absolute steering angles.

In certain embodiments, the electronic controller 125 also uses the steering angle to calculate a hysteresis torque (step 320). The hysteresis torque is determined based upon the relative steering angle. In one embodiment, a relative steering angle vs. torque look-up table is used to calculate the hysteresis torque. The electronic controller 125 then sums the steering assistance torque and the hysteresis torque to determine a turning torque (step 325).

In some embodiments, the turning torque can be limited based upon a rotor speed of the electric motor 120. In one example, the electronic controller 125 receives a rotor speed from the rotor speed sensor 130 and, based upon the rotor speed of the motor, limit or dampen the turning torque. In one embodiment, a maximum torque limit for the turning torque is set to 10 N/m in order to allow the operator of the vehicle 100 to override the turning torque in the event the operator of the vehicle 100 must do so. It is to be understood that other values, such as 8 N/m, may be set as the maximum.

The electronic controller 125 then calculates a return torque, which is a torque used to return the steering wheel 115 back to a center or neutral position for steering (step 330). The electronic controller 125 may determine the return torque based upon a current torque being applied to the steering rack 110, the turning torque, or a look-up table indicating a necessary torque to return the steering wheel to a center or neutral position based upon the steering angle. In one embodiment, the electronic controller 125 requires a torsion bar torque sensor signal value to calculate the return torque. Because the torsion bar torque sensor has failed, the electronic controller 125 uses zero as the torsion bar torque sensor value when calculating the return torque.

The electronic controller 125 also sums the turning torque and the return torque to determine an output torque (step 330). The turning torque and the return torque are summed to determine the amount and direction of torque (the output torque) to apply to the steering rack 110 by the electric motor 120.

The electronic controller 125 also receives a steering angle speed (for example, a steering angle angular velocity) from the steering angle sensor 135. Based on the steering angle speed and the steering angle, the electronic controller 125 is configured to determine if a driver of the vehicle 100 is turning the steering wheel 115 to steer the vehicle 100 or returning the steering wheel 115 back to the center or neutral position. For example, if the steering angle is 90 degrees and steering angle speed indicate that the steering wheel 115 is being turned counterclockwise, the electronic controller 125 determines that the driver is turning the steering wheel to steer the vehicle 100 to the left. In contrast, if the steering angle is 90 degrees but the steering angle speed indicates that the driver is turning the steering wheel clockwise, the electronic controller 125 determines that the driver is returning the steering wheel 115 to the center or neutral position.

If the driver is turning the steering wheel 115 to steer the vehicle 100, the electronic controller 125 is configured to sum the turning torque and the return torque with the turning torque as the dominant torque in the summation. For example, the turning torque may be multiplied by a first gradient value and the return torque is multiplied by a second gradient value. The first gradient value and second gradient value are selected such that the first gradient value is greater than the second gradient value. Thus, the turning torque will be larger than the return torque, and the resulting output torque from the summation will be a torque to assist in the turning of the steering wheel 115.

In contrast, if the driver is returning the steering wheel 115 to the center or neutral position, the electronic controller 125 is configured to sum the turning torque and the return torque with the return torque as the dominant torque in the summation. For example, the return torque may be multiplied by a first gradient value and the turning torque is multiplied by a second gradient value. The first gradient value and second gradient value are selected such that the first gradient value is greater than the first gradient value. Thus, the return torque will be larger than the turning torque, and the resulting output torque from the summation will be a torque to assist in the returning of the steering wheel 115 to the center or neutral position.

The first gradient value and the second gradient value are pre-set values, for example, 0.2 N/m per second. During fade-in, the current turning torque linearly increases at the gradient value (for example, 0.2 N/m per second) until it reaches the target torque. During fade-out, the target torque is zero, and the current torque decreases at the gradient value (for example, 0.2 N/m per second) until the current torque is zero. In some embodiments, the first gradient value and the second gradient value have the same value (for example, both are 0.2 N/m per second). In other embodiments, the first gradient value and the second gradient value have different values.

The electronic controller 125 may also receive a road friction signal from the road friction sensor 145. The electronic controller 125 may then multiply the output torque by a reduction factor that is determined based upon the road friction signal. For example, if the driving surface is slick from rain or snow, the output torque should be minimized to avoid oversteering or overcorrecting when returning the steering wheel 115. Therefore, a value, for example 0.5, may be multiplied with the output torque to produce a reduced output torque. This reduced output torque may then be provided to the electric motor 120 as described below.

The method 300 also includes generating, with the electronic controller 125, a command for the electric motor 120 to apply the output torque to the steering rack 110 or other steering mechanism (step 335). The electric motor 120 applies the output torque or modified output torque to the steering rack 110 to assist in turning the steering wheel 115 or returning the steering wheel 115 to the center position.

Figure 4:
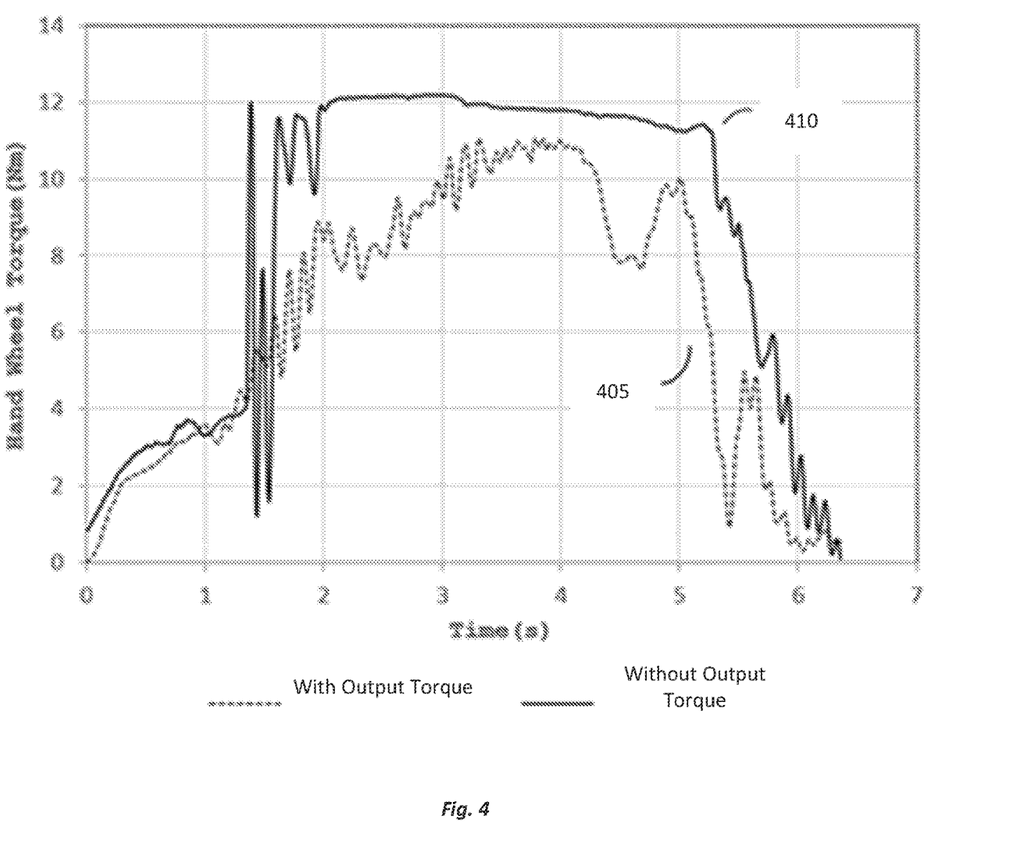
FIG. 4 is a graph illustrating differences between applying an output torque and not applying output torque when a torsion bar torque sensor fails according to one embodiment.

FIG. 4 illustrates a graph 400 illustrating a first curve 405 when the output torque is applied and a second curve 410 when the output torque is not applied when a torsion bar torque sensor fails according to one embodiment. As shown, when the output torque is not applied, the steering wheel torque is much more erratic over time.

The following examples illustrate example systems and methods described herein. Example 1: an electric power steering system, comprising an electric motor configured to provide a torque to a steering mechanism of a vehicle; a torsion bar torque sensor; a vehicle speed sensor; a steering angle sensor; and an electronic controller configured to determine a failure of the torsion bar torque sensor; receive a vehicle speed from the vehicle speed sensor and a steering angle from the steering angle sensor; calculate a steering assistance torque based on the vehicle speed and the steering angle; calculate a hysteresis torque based on the steering angle; sum the steering assistance torque and the hysteresis torque to determine a turning torque; calculate a return torque and sum the turning torque and return torque to obtain an output torque; and generate a command for the electric motor to provide the output torque to the steering mechanism.

Example 2: the system of example 1, further comprising a rotor speed sensor configured to detect a rotor speed of the electric motor, and wherein the electronic controller is further configured to limit the turning torque based upon the rotor speed.

Example 3: the system of examples 1 or 2, the electronic controller further configured to calculate the return torque based upon a torsion bar torque value set to zero.

Example 4: the system of any of examples 1-3, the electronic controller further configured to receive a steering angle speed from the steering angle determine if an operator of the vehicle is turning a steering wheel of the vehicle or returning the steering wheel to a center position based upon the steering angle and the steering angle speed.

Example 5: the system of example 4, wherein if the operator of the vehicle is turning the steering wheel, the electronic controller is configured to sum the turning torque and the return torque with the turning torque as a dominant torque to calculate the output torque.

Example 6: the system of example 5, wherein the turning torque is set as the dominant torque by multiplying the turning torque by a first gradient and multiplying the return torque by a second gradient before summing the turning torque and the return torque.

Example 7: the system of example 4, wherein if the operator of the vehicle is returning the steering wheel to the center position, the electronic controller is configured to sum the turning torque and the return torque with the return torque as a domination torque to calculate the output torque.

Example 8: the system of example 7, wherein the return torque is set as the dominant torque by multiplying the turning torque by a first gradient and multiplying the return torque by a second gradient before summing the turning torque and the return torque.

Example 9: the system of any of examples 1-8, further comprising a road friction sensor configured to provide a road friction signal to the electronic controller.

Example 10: the system of example 9, wherein the electronic controller is further configured to determine a reduction factor based upon the road friction signal and multiply the output torque by the reduction factor before generating the command.

Example 11: a method for controlling an electric power steering system, comprising determining, with an electronic controller, a failure in a torsion bar torque sensor; receiving, with the electronic controller, a vehicle speed from a vehicle spend sensor and a steering angle from a steering angle sensor; calculating, with the electronic controller, a steering assistance torque based on the vehicle speed and the steering angle; calculating, with the electronic controller, a hysteresis torque based on the steering angle; summing, with the electronic controller, the steering assistance torque and the hysteresis torque to determine a turning torque; calculating, with the electronic controller, a return torque; summing, with the electronic controller, the turning torque and return torque to obtain an output torque; and generating, with the electronic controller, a command for an electric motor to provide the output torque to the steering mechanism.

Example 12: the method of example 11, further comprising receiving, with the electronic controller, a rotor speed of the electric motor from a rotor speed sensor and limiting, with the electronic controller, the turning torque based upon the rotor speed.

Example 13: the method of examples 11 or 12, further comprising calculating, with the electronic controller, the return torque based upon a torsion bar torque value set to zero.

Example 14: the method of any of examples 11-13, further comprising receiving, with the electronic controller, a steering angle speed from the steering angle and determining, with the electronic controller, if an operator of the vehicle is turning a steering wheel of the vehicle or returning the steering wheel to a center position based upon the steering angle and the steering angle speed.

Example 15: the method of example 14, wherein if the operator of the vehicle is turning the steering wheel, summing, with the electronic controller, the turning torque and the return torque with the turning torque as a dominant torque to calculate the output torque.

Example 16: the method of example 15, wherein the turning torque is set as the dominant torque by multiplying the turning torque by a first gradient and multiplying the return torque by a second gradient before summing the turning torque and the return torque.

Example 17: the method of example 14, wherein if the operator of the vehicle is returning the steering wheel to the center position, summing, with the electronic controller, the turning torque and the return torque with the return torque as a domination torque to calculate the output torque.

Example 18: the method of example 17, wherein the return torque is set as the dominant torque by multiplying the turning torque by a first gradient and multiplying the return torque by a second gradient before summing the turning torque and the return torque.

Example 19: the method of any of examples 11-18, further comprising receiving, with the electronic controller, a road friction signal from a road friction sensor.

Example 20: the method of example 19, further comprising determining, with the electronic controller, a reduction factor based upon the road friction signal and multiplying, with the electronic controller, the output torque by the reduction factor before generating the command.

Thus, embodiments described herein describe an electric power steering system.

Various features, advantages, and embodiments are set forth in the following claims.

What is claimed is:

1. An electric power steering system comprising:
   an electric motor configured to provide a torque to a steering mechanism of a vehicle;
   a torsion bar torque sensor;
   a vehicle speed sensor;
   a steering angle sensor;
   a road friction sensor; and
   an electronic controller configured to
   determine a failure of the torsion bar torque sensor;
   receive a vehicle speed from the vehicle speed sensor and a steering angle from the steering angle sensor;
   calculate a steering assistance torque based on the vehicle speed and the steering angle;
   calculate a hysteresis torque based on the steering angle;
   sum the steering assistance torque and the hysteresis torque to determine a turning torque;
   calculate a return torque and sum the turning torque and return torque to obtain an output torque, the return torque or the turning torque being a dominating torque;
   determine a reduction factor based upon a road friction signal provided by the road friction sensor;
   multiply the output torque by the reduction factor; and
   generate a command for the electric motor to provide the output torque to the steering mechanism.

2. The system of claim 1, further comprising a rotor speed sensor configured to detect a rotor speed of the electric motor, and wherein the electronic controller is further configured to limit the turning torque based upon the rotor speed.

3. The system of claim 1, the electronic controller further configured to calculate the return torque based upon a torsion bar torque value set to zero.

4. The system of claim 1, the electronic controller further configured to receive a steering angle speed from the steering angle sensor and determine if an operator of the vehicle is turning a steering wheel of the vehicle or returning the steering wheel to a center position based upon the steering angle and the steering angle speed.

5. The system of claim 4, wherein if the operator of the vehicle is turning the steering wheel, the electronic controller is configured to sum the turning torque and the return torque with the turning torque as the dominant torque to calculate the output torque.

6. The system of claim 5, wherein the turning torque is set as the dominant torque by multiplying the turning torque by a first gradient and multiplying the return torque by a second gradient before summing the turning torque and the return torque.

7. The system of claim 4, wherein if the operator of the vehicle is returning the steering wheel to the center position, the electronic controller is configured to sum the turning torque and the return torque with the return torque as the domination torque to calculate the output torque.

8. The system of claim 7, wherein the return torque is set as the dominant torque by multiplying the turning torque by a first gradient and multiplying the return torque by a second gradient before summing the turning torque and the return torque.

9. A method for controlling an electric power steering system, comprising
   determining, with an electronic controller, a failure in a torsion bar torque sensor;
   receiving, with the electronic controller, a vehicle speed from a vehicle spend sensor and a steering angle from a steering angle sensor;
   calculating, with the electronic controller, a steering assistance torque based on the vehicle speed and the steering angle;
   calculating, with the electronic controller, a hysteresis torque based on the steering angle; summing, with the electronic controller, the steering assistance torque and the hysteresis torque to determine a turning torque;
   calculating, with the electronic controller, a return torque;
   summing, with the electronic controller, the turning torque and return torque to obtain an output torque, the return torque or the turning torque being a dominating torque;

receiving, from a road friction sensor, a road friction signal;

determining, with the electronic controller, a reduction factor based upon the road friction signal;

multiplying, with the electronic controller, the output torque by the reduction factor; and generating, with the electronic controller, a command for an electric motor to provide the output torque to the steering mechanism.

10. The method of claim 9, further comprising receiving, with the electronic controller, a rotor speed of the electric motor from a rotor speed sensor and limiting, with the electronic controller, the turning torque based upon the rotor speed.

11. The method of claim 9, further comprising calculating, with the electronic controller, the return torque based upon a torsion bar torque value set to zero.

12. The method of claim 9, further comprising receiving, with the electronic controller, a steering angle speed from the steering angle sensor and determining, with the electronic controller, if an operator of the vehicle is turning a steering wheel of the vehicle or returning the steering wheel to a center position based upon the steering angle and the steering angle speed.

13. The method of claim 12, wherein if the operator of the vehicle is turning the steering wheel, summing, with the electronic controller, the turning torque and the return torque with the turning torque as a dominant torque to calculate the output torque.

14. The method of claim 13, wherein the turning torque is set as the dominant torque by multiplying the turning torque by a first gradient and multiplying the return torque by a second gradient before summing the turning torque and the return torque.

15. The method of claim 12, wherein if the operator of the vehicle is returning the steering wheel to the center position, summing, with the electronic controller, the turning torque and the return torque with the return torque as a domination torque to calculate the output torque.

16. The method of claim 15, wherein the return torque is set as the dominant torque by multiplying the turning torque by a first gradient and multiplying the return torque by a second gradient before summing the turning torque and the return torque.

* * * * *